(12) United States Patent
Shih

(10) Patent No.: US 11,445,071 B2
(45) Date of Patent: Sep. 13, 2022

(54) DOCUMENT PROCESSING DEVICE, DOCUMENT PROCESSING SYSTEM, AND DATA PROCESSING METHOD FOR UTILIZATION OF EXCLUSIVE PHONE NUMBER INFORMATION

(71) Applicant: AVISION INC., Hsinchu (TW)

(72) Inventor: Po-Sheng Shih, Hsinchu (TW)

(73) Assignee: AVISION INC., Hsinchu (TW)

( * ) Notice: Subject to any disclaimer, the term of this patent is extended or adjusted under 35 U.S.C. 154(b) by 0 days.

(21) Appl. No.: 17/371,134

(22) Filed: Jul. 9, 2021

(65) Prior Publication Data

US 2022/0030121 A1 Jan. 27, 2022

(30) Foreign Application Priority Data

Jul. 27, 2020 (TW) .................................. 109125269

(51) Int. Cl.
*H04N 1/00* (2006.01)
*H04N 1/32* (2006.01)
*H04W 8/20* (2009.01)

(52) U.S. Cl.
CPC ..... *H04N 1/00106* (2013.01); *H04N 1/00228* (2013.01); *H04N 1/00244* (2013.01); *H04N 1/00307* (2013.01); *H04N 1/32122* (2013.01); *H04W 8/20* (2013.01); *H04N 2201/0081* (2013.01); *H04N 2201/3205* (2013.01); *H04N 2201/3209* (2013.01)

(58) Field of Classification Search
CPC ........... H04N 1/00228; H04N 1/00244; H04N 1/00307; H04N 1/32122; H04N 2201/0081; H04N 2201/3205; H04N 2201/3209; H04W 8/20
See application file for complete search history.

(56) References Cited

U.S. PATENT DOCUMENTS

| 2015/0092233 A1* | 4/2015 | Park .................... H04N 1/00307 358/1.15 |
| 2016/0065781 A1* | 3/2016 | Um .................... H04N 1/32106 358/1.15 |

* cited by examiner

*Primary Examiner* — Nicholas Pachol

(57) ABSTRACT

A document processing device, a document processing system, and a data processing method for the same are introduced. The document processing device utilizes an exclusive user identification information and an exclusive phone number information. After obtaining a document image, all the document image, the exclusive user identification information and the exclusive phone number information are used to generate document image file information. The document image file information is transmitted to a remote storage through a mobile network. Since the document image file information is directly sent by the document processing device to the remote storage according to the unique user identification and unique phone number information through the mobile network, not only can the cumbersome and complicated configuration process be avoided, but also the risk of information theft can be reduced, thereby improving information storage specificity, confidentiality, and security.

12 Claims, 3 Drawing Sheets

DOCUMENT PROCESSING DEVICE, DOCUMENT PROCESSING SYSTEM, AND DATA PROCESSING METHOD FOR UTILIZATION OF EXCLUSIVE PHONE NUMBER INFORMATION

CROSS-REFERENCE TO RELATED APPLICATION

This non-provisional application claims priority under 35 U.S.C. § 119(a) on Patent Application No(s). 109125269 filed in Taiwan, R.O.C. on Jul. 27, 2020, the entire contents of which are hereby incorporated by reference.

BACKGROUND OF THE INVENTION

1. Field of the Invention

The present disclosure relates to document processing devices and document processing systems, and in particular to a document processing device capable of mobile network communication, a document processing system, and a data processing method for the same.

2. Description of the Related Art

Owing to advancement in technology and the need to effectively enhance the ease and efficiency of document processing, a document processing device, such as a scanner or a multi-function printer, is devised and is available for use at workplaces, shops and schools.

A user scans paper-based documents with the document processing device and then stores the scanned document images in a portable storage medium. However, the user cannot store any document images in the absence of the portable storage medium—a user-unfriendly scenario. In view of this, the industry sector developed a document processing device connectable to a network. To access the network-connected document processing device, a user signs up a username and password to acquire a storage space in a cloud-based hard disk offered by a portal, such as Google. Then, the user configures the document processing device to connect the document processing device to the cloud-based hard disk via a cable network or wireless network (Wi-Fi). After the user has scanned paper-based documents with the document processing device, the document processing device sends resultant document images to the cloud-based hard disk for storage.

After that, the user has to acquire access authority and storage space of the cloud-based hard disk in order to configure the settings of the document processing device; however, the configuration process is complicated and intricate to the detriment of ease of use. Next, the user finishes configuring the settings for connecting the document processing device to the cloud-based hard disk. There is not any exclusive relationship between the cloud-based hard disk and the document processing device. The portal administrator provides information storage space but does not take care of the security of whatever information stored therein. After the document processing device has uploaded the document images to the cloud-based hard disk, the document images may be maliciously stored in another cloud-based hard disk, and thus risks of document image theft increase, whenever the settings for connecting the document processing device to the cloud-based hard disk are tampered with or information required for logging in to the cloud-based hard disk gets lost or is stolen. If the stored document images are taken of an important contract and show personal data, not only will property loss occur, but a violation of a law governing personal data protection will also happen.

BRIEF SUMMARY OF THE INVENTION

An objective of the present disclosure is to provide a document processing device, a document processing system, and a data processing method for the same, thereby connecting the document processing device to an exclusive cloud storage space via a mobile network according to a phone number information. The present disclosure dispenses with any complicated, intricate configuration process, prevents the settings of the document processing device from being tampered with and thus leading to an increase in data theft risks, thereby enhancing the specificity, confidentiality and security of information storage.

To achieve at least the above objective, the present disclosure provides the document processing device connecting to a remote end via a mobile network, the document processing device comprising:

a scanning module adapted to obtain at least one document image;

a mobile communication module having a user identification module, the user identification module being predefined with an exclusive user identification information and an exclusive phone number information, the mobile communication module connecting to the remote end via the mobile network according to the exclusive phone number information; and a processing module connecting to the scanning module and the mobile communication module to obtain the document image, the exclusive user identification information and the exclusive phone number information, wherein the processing module generates a document image file information according to the document image, the exclusive user identification information and the exclusive phone number information and sends, via the mobile communication module, the document image file information to an exclusive cloud folder created according to the exclusive user identification information and the exclusive phone number information and disposed at the remote end, for storage.

As disclosed above, the exclusive cloud folder at the remote end is created according to the exclusive user identification information and the exclusive phone number information, and the document processing device is predefined with the corresponding exclusive user identification information and exclusive phone number information, such that the exclusive user identification information and the exclusive phone number information are exclusive, sole information between the document processing device and the remote end. Therefore, the document processing device directly stores the document image file information in the exclusive cloud folder via the mobile network according to the exclusive phone number information, so as to not only dispense with any complicated, intricate configuration process but also reduce the risks of data theft caused by tampering with the settings of the document processing device, thereby enhancing the specificity, confidentiality and security of information storage.

To achieve at least the above objective, the present disclosure provides the document processing system, comprising:

a mobile device;

a document processing device connecting to the mobile device and comprising a mobile communication module, the mobile communication module having a user identification module, the user identification module being predefined with an exclusive user identification information and an exclusive phone number information, wherein the document processing device connects to a mobile network according to the exclusive phone number information;

a cloud server at a remote end, the cloud server connecting to the document processing device via the mobile network, wherein an exclusive cloud folder is created in the cloud server according to the exclusive user identification information and the exclusive phone number information, wherein the cloud server receives a document image file information generated by the document processing device according to at least one document image, the exclusive user identification information and the exclusive phone number information and stores the document image file information in the exclusive cloud folder, wherein, after the cloud server has received a file request information from the document processing device, the document image file information is sent from the corresponding exclusive cloud folder to the mobile device via the document processing device.

As disclosed above, both the exclusive user identification information and the exclusive phone number information are exclusive, sole information between the cloud server and the document processing device, and thus the document processing device stores document image file information directly in the exclusive cloud folder, so as to dispense with any complicated, intricate configuration process, prevent the settings of the document processing device from being tampered with and thus leading to an increase in data theft risks. In addition, the document image file information is retrieved from the exclusive cloud folder with the document processing device via the mobile device. Therefore, the present disclosure enhances the specificity, confidentiality and security of information storage.

To achieve at least the above objective, the present disclosure provides an information processing method for the document processing system, connecting a document processing device to a remote end via a mobile network, the method comprising the steps of:

receiving, by the document processing device, at least one document image;

generating, by the document processing device, a document image file information according to the document image, an exclusive user identification information and an exclusive phone number information; and sending, by the document processing device, the document image file information to a folder created according to the exclusive user identification information and the exclusive phone number information and disposed at the remote end, for storage.

As disclosed above, both the exclusive user identification information and the exclusive phone number information are exclusive, sole information between the remote end and the document processing device, and thus the document processing device stores document image file information directly in a folder at the remote end, so as to dispense with any complicated, intricate configuration process, prevent the settings of the document processing device from being tampered with and thus leading to an increase in data theft risks, thereby enhancing the specificity, confidentiality and security of information storage.

DETAILED DESCRIPTION OF THE INVENTION

To facilitate understanding of the object, characteristics and effects of this present disclosure, embodiments together with the attached drawings for the detailed description of the present disclosure are provided.

Figure 1:
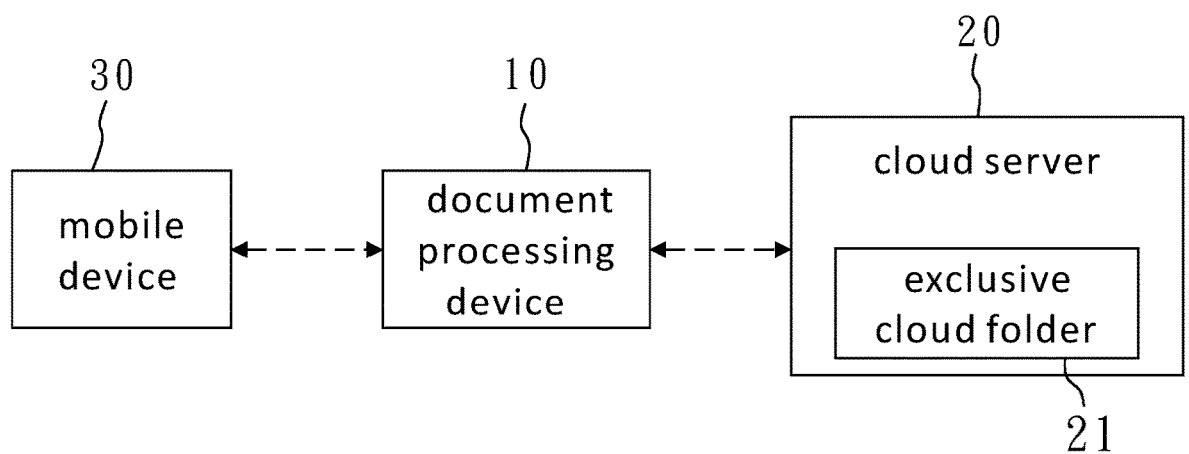
FIG. 1 is a block diagram of a preferred embodiment of the present disclosure.
Figure 2:
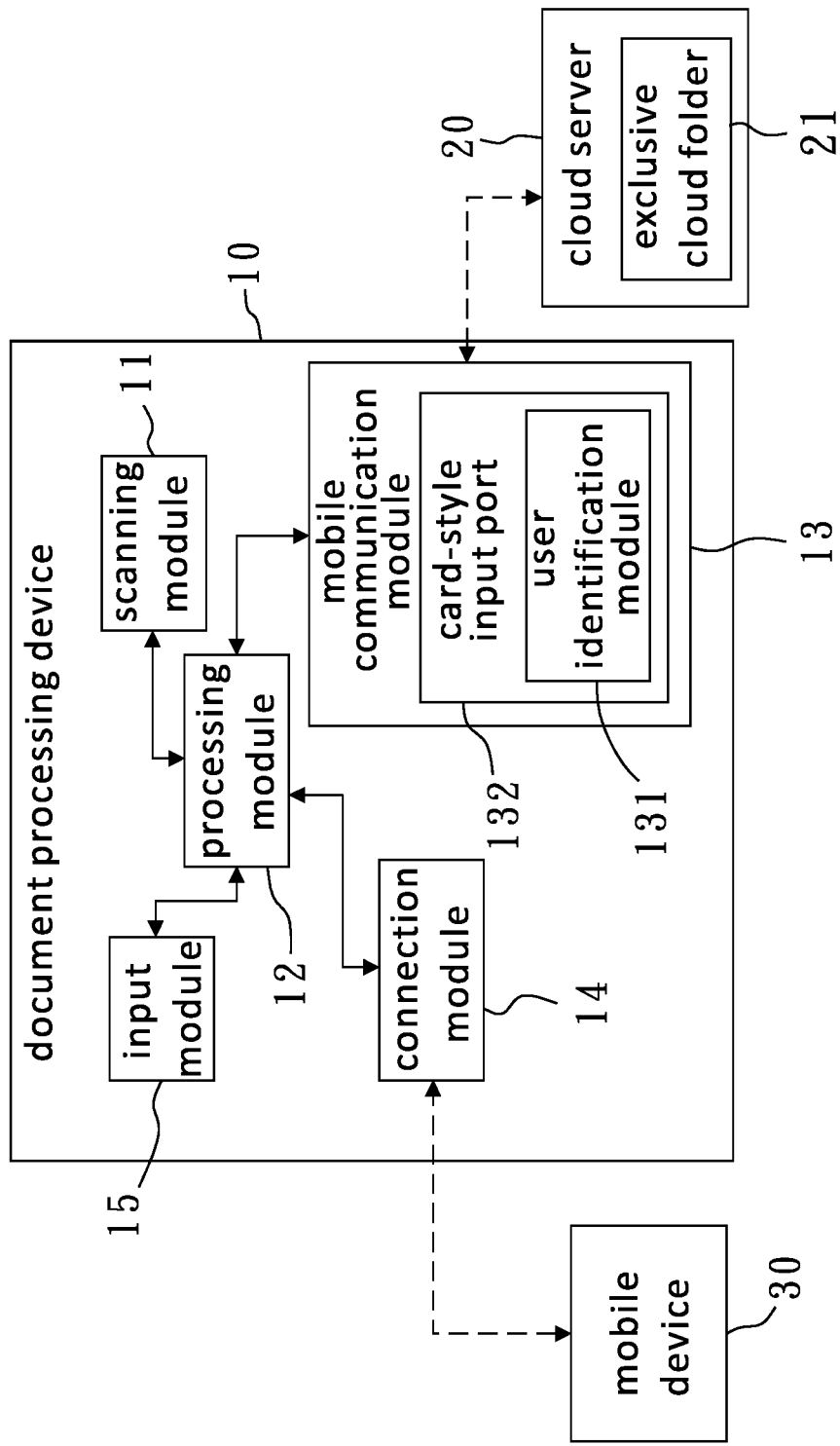
FIG. 2 is a block diagram of a document processing device according to a preferred embodiment of the present disclosure.

Referring to FIGS. 1, 2, in a preferred embodiment of the present disclosure, a document processing system comprises a document processing device 10, a cloud server 20 at a remote end, and a mobile device 30 owned by a user. The document processing device 10 connects to the mobile device 30 and connects to the cloud server 20 via a mobile network.

The specific framework of the document processing device 10 and the connective relationship between the document processing device 10, the cloud server 20, and the mobile device 30 are described below. Referring to FIG. 1, 2, the document processing device 10 comprises a scanning module 11, a processing module 12, a mobile communication module 13, a connection module 14 and an input module 15. The processing module 12 connects to the scanning module 11, the mobile communication module 13, the connection module 14 and the input module 15. The scanning module 11 is adapted to obtain at least one document image. The processing module 12 processes the received data or stores related data. The mobile communication module 13 has a user identification module 131. The user identification module 131 is predefined with an exclusive user identification information and an exclusive phone number information. The mobile communication module 13 has a mobile network communication protocol, connects to a mobile network according to the exclusive phone number information and the mobile network communication protocol, and connects to the cloud server 20 via the mobile network to exchange information. The connection module 14 connects to the mobile device 30 to exchange information.

In this embodiment, the scanning module 11 is a scanning image sensor (not shown) and a paper input mechanism (not shown) of the document processing device 10. The paper input mechanism is a plane-style paper placement mechanism or a feed-style paper placement mechanism. The scanning image sensor is an image sensor (Charge Coupled Device, CCD, or Complementary Metal-Oxide Semiconductor, CMOS) for sensing any input paper and outputting a document image.

In this embodiment, the processing module 12 is a CPU.

In this embodiment, the mobile communication module 13 is a GSM network card, a 3G network card, a 4G network card, a 5G network card, or a mobile communication network card at a higher technical level.

In this embodiment, the user identification module 131 is a SIM (Subscriber Identity Module) card or an eSIM (Embedded-SIM) card.

In this embodiment, the document processing device 10 has therein a demountable card-style input port 132 (not shown). The card-style input port 132 demountably holds the user identification module 131. After having held the user identification module 131, the card-style input port 132 is mounted in the mobile communication module 13.

In this embodiment, the connection module 14 is a Wi-Fi module or a Bluetooth module.

In this embodiment, the input module 15 is a touchscreen, a physical button, or a combination thereof disposed on the document processing device 10.

In this embodiment, the document processing device 10 is a scanner or a multi-function printer (MFP).

In this embodiment, the cloud server 20 stores therein the exclusive user identification information and the exclusive phone number information, and an exclusive cloud folder 21 is created in the cloud server 20 according to the exclusive user identification information and the exclusive phone number information. The cloud server 20 is provided by a telecommunication service provider or provided by a third-party service provider capable of creating a cloud folder in accordance with the exclusive user identification information and the exclusive phone number information. The cloud server 20 stores all the corresponding exclusive user identification information and exclusive phone number information.

In this embodiment, the mobile device 30 is a smartphone, a tablet, or a smart wearable device capable of wireless connection.

The way in which the document processing device 10 stores the obtained document image in the cloud server 20 involves the user's placing the paper-based document to be scanned on the scanning module 11 of the document processing device 10, inputting related scanning settings with the input module 15, acquiring at least one document image with the scanning module 11, receiving the document image by the processing module 12, reading the exclusive user identification information and exclusive phone number information in the user identification module 131, generating a document image file information by the processing module 12 according to the document image, the exclusive user identification information and the exclusive phone number information, and sending the document image file information to the exclusive cloud folder 21 of the cloud server 20 by the processing module 12 via the mobile communication module 13 and the mobile network according to the exclusive phone number information.

After receiving the document image file information, the cloud server 20 confirms the corresponding exclusive cloud folder 21 according to the exclusive user identification information and exclusive phone number information in the document image file information and then stores the document image file information in the corresponding exclusive cloud folder 21. The cloud server 20 confirms, according to the document image file information, which said document processing device 10 sends the document image file information, so as to not only monitor and control a file transmission source effectively and safely. In case of a file anomaly, the service provider sends a message to the document processing device 10 to request the user to look for a related file. Therefore, only persons in possession of the exclusive user identification information and phone number information are able to access the corresponding exclusive cloud folder 21. Therefore, the present disclosure dispenses with usernames and passwords which are otherwise required, according to the prior art, to log in to a cloud server. Therefore, the present disclosure reduces the risks of file theft caused by login information theft and thus enhances usage security.

In addition to the aforesaid process of storing a file in the cloud server 20, the user can retrieve a file stored in the cloud server 20. To this end, the document processing device 10 provides a near-end mode. In the near-end mode, the mobile device 30 builds a connection to the connection module 14 of the document processing device 10, and the connection module 14 is the Bluetooth module or the Wi-Fi module. Therefore, to build a connection to the connection module 14, the mobile device 30 inputs a verification information, and then the connection to the connection module 14 is built upon successful verification, thereby enhancing security.

After the mobile device 30 has built a connection to the document processing device 10, the user uses the mobile device 30 to send a file request information to the document processing device 10, and then the document processing device 10 connects to the cloud server 20 via the mobile network according to the exclusive phone number information. Therefore, the document processing device 10 connects directly to the corresponding exclusive cloud folder 21, downloads the document image file information from the cloud server 20, and finally sends the document image file information to the mobile device 30. Since the document processing device 10 connects to the cloud server 20 via the mobile network according to the exclusive phone number information predefined in the document processing device 10, not only is data theft caused by login information theft prevented, but ease of use is also enhanced because of the use of the exclusive phone number information in building a connection to the corresponding exclusive cloud folder 21.

The mobile device 30 has therein a user identification module. The user identification module in the mobile device 30 is predefined with an exclusive user identification information and an exclusive phone number information. The exclusive user identification information of the user identification module of the mobile device 30 includes an identity correlation information. The identity correlation information corresponds to the exclusive user identification information of the user identification module of the document processing device 10 (The same user has different user identification modules (SIM card or eSIM card).)

When the user uses the mobile device 30 to connect to the cloud server 20 with its own user identification module and via the mobile network, the cloud server 20 confirms, according to the identity correlation information included in the exclusive user identification information of the mobile device 30, whether the correlated (or corresponding) exclusive user identification information of the document processing device 10 is available. Upon confirmation of the available correlated (or corresponding) exclusive user identification information, the mobile device 30 can connect to the corresponding exclusive cloud folder 21, allowing the mobile device 30 to download the corresponding document image file information from the corresponding exclusive cloud folder 21. The mobile device 30 remotely connects to the exclusive cloud folder 21 of the cloud server 20 to fetch the required document image file information, so as to not only increase usage distance and thus enhance ease of use, but also reduce the risks of file theft caused by loss or theft of related data for use in logging in to the exclusive cloud folder 21 and thus enhance usage security.

Therefore, the user identification module 131 of the mobile communication module 13 is predefined with the exclusive user identification information and the exclusive phone number information, such that the document processing device 10 directly connects to the cloud server 20 via the mobile network and according to the exclusive phone number information, so as to dispense with any complicated, intricate configuration process with a view to enhancing the ease of storing a file in the cloud server 20. Since both the exclusive user identification information and the exclusive phone number information are exclusive, sole information between the cloud server 20 and the document processing device 10, not only is the exclusive phone number information required for uploading the document image file information to the cloud server 20 for storage, but it is also feasible to reduce the risks of tampering with the settings of the document processing device 10 and thus storing data to a wrong cloud server to thereby cause data theft, so as to enhance the specificity, confidentiality and security of information storage.

Figure 3:
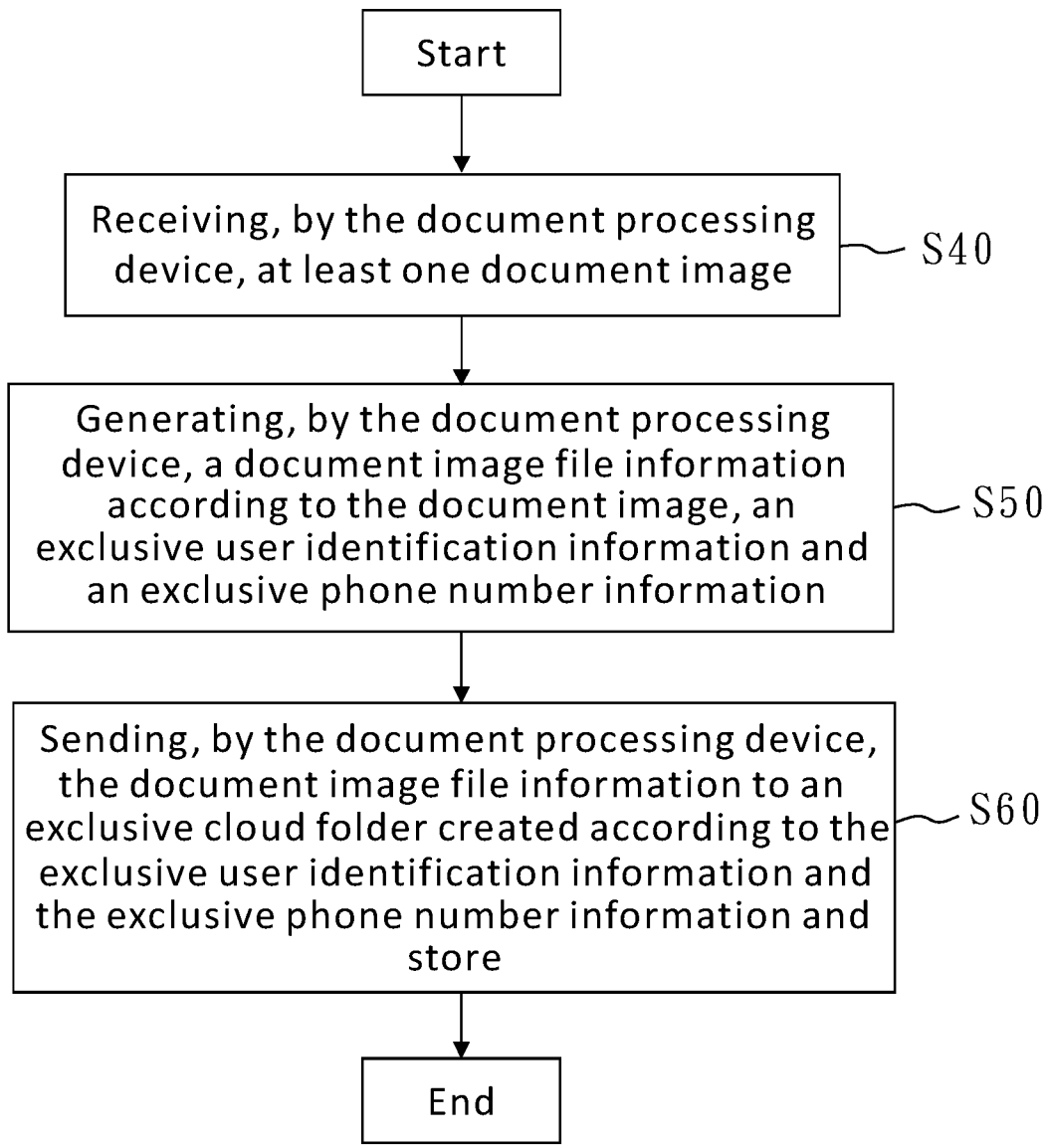
FIG. 3 a schematic view of a process flow of a method according to a preferred embodiment of the present disclosure.

It can be deduced from the above embodiments and description thereof an information processing method for a document processing system. With the information processing method, the document processing device 10 connects to the cloud server 20 at the remote end via the mobile network. Referring to FIG. 3, the method comprises the steps of:

receiving, by the document processing device 10, at least one document image (S40);

generating, by the document processing device 10, a document image file information according to the document image, an exclusive user identification information and an exclusive phone number information (S50); and sending, by the document processing device 10, the document image file information to an exclusive cloud folder 21 created according to the exclusive user identification information and the exclusive phone number information and disposed in the cloud server 20 at the remote end so as to directly store the document image file information in the exclusive cloud folder 21 (S60).

After the step "sending, by the document processing device 10, the document image file information to an exclusive cloud folder 21 created according to the exclusive user identification information and the exclusive phone number information and disposed in the cloud server 20 at the remote end so as to directly store the document image file information in the exclusive cloud folder 21 (S60)," the cloud server 20 confirms the corresponding exclusive cloud folder 21 according to the exclusive user identification information and exclusive phone number information in the document image file information and then stores the document image file information in the corresponding exclusive cloud folder 21.

In this embodiment, after the user has stored the document image file information in the cloud server 20, if the user needs to retrieve the document image file information, the mobile device 30 will connect to the document processing device 10 and send a file request information to the document processing device 10. After receiving the file request information from the mobile device 30, the document processing device 10 fetches the document image file information from the cloud server 20 and sends it to the mobile device 30. The document processing device 10 connects to the exclusive cloud folder 21 of the cloud server 20 according to the file request information and the exclusive phone number information to retrieve the document image file information and send it to the mobile device 30.

While the present disclosure has been described by means of specific embodiments, numerous modifications and variations could be made thereto by those skilled in the art without departing from the scope and spirit of the present disclosure set forth in the claims.

What is claimed is:

1. A document processing device, connecting to a remote end via a mobile network, the document processing device comprising:

a scanning image sensor and a paper input mechanism adapted to obtain at least one document image;

a mobile network card having a subscriber identity module card, the subscriber identity module card being predefined with an exclusive user identification information and an exclusive phone number information, the mobile network card connecting to the remote end via the mobile network according to the exclusive phone number information; and a CPU connecting to the scanning image sensor and a paper input mechanism and the mobile network card to obtain the document image, the exclusive user identification information and the exclusive phone number information;

wherein the CPU generates a document image file information according to the document image, the exclusive user identification information and the exclusive phone number information and sends, via the mobile network card, the document image file information to an exclusive cloud folder created according to the exclusive user identification information and the exclusive phone number information and disposed at the remote end, for storage.

2. The document processing device of claim 1, wherein the mobile network card is a GSM network card, a 3G network card, a 4G network card or a 5G network card.

3. The document processing device of claim 1, wherein the subscriber identity module card is a SIM card or an eSIM card.

4. The document processing device of claim 1, further comprising a card-style input port demountable holding the subscriber identity module card and demountably disposed in the document processing device.

5. The document processing device of claim 1, further comprising a connection module connected to the CPU and a mobile device, wherein, after receiving a file request information form the module device via the connection module, the CPU fetches the document image file information form the remote end and sends the document image file information to the mobile device.

6. The document processing device of claim 1, wherein the remote end comprises a cloud server, and the cloud server stores all the corresponding exclusive user identification information and exclusive phone number information.

7. The document processing system, comprising:

a mobile device;

a document processing device connecting to the mobile device and comprising a mobile network card, the subscriber identity module card being predefined with an exclusive user identification information and an exclusive phone number information, wherein the document processing device connects to a mobile network according to the exclusive phone number information;

a cloud server at a remote end, the cloud server connecting to the document processing device via the mobile network, wherein an exclusive cloud folder is created in the cloud server according to the exclusive user identification information and the exclusive phone number information;

wherein the cloud server receives a document image file information generated by the document processing device according to at least one document image, the exclusive user identification information and the exclusive phone number information and stores the document image file information in the exclusive cloud folder, wherein, after the cloud server has received a file request information from the document processing device, the document image file information is sent from the corresponding exclusive cloud folder to the mobile device via the document processing device.

8. The document processing system of claim 7, wherein the mobile network card is a GSM network card, a 3G network card, a 4G network card or a 5G network card.

9. The document processing system of claim 8, wherein the subscriber identity module card is a SIM card or an eSIM card.

10. The document processing system of claim 8, further comprising a card-style input port demountable holding the subscriber identity module card and demountably disposed in the document processing device.

11. A data processing method for a document processing system, connecting a document processing device to a remote end via a mobile network, the method comprising the steps of:

receiving, by the document processing device, at least one document image;

generating, by the document processing device, a document image file information according to the document image, an exclusive user identification information and an exclusive phone number information; and sending, by the document processing device, the document image file information to a folder created according to the exclusive user identification information and the exclusive phone number information and disposed at the remote end, for storage.

12. The data processing method for a document processing system according to claim 11, wherein the document processing device further connects to a mobile device and fetches the document image file information from the remote end and sends the document image file information to the mobile device upon receipt of a file request information sent from the mobile device.

* * * * *